(12) United States Patent
Sun et al.

(10) Patent No.: US 8,926,860 B2
(45) Date of Patent: Jan. 6, 2015

(54) CATHODE ACTIVE MATERIAL WITH WHOLE PARTICLE CONCENTRATION GRADIENT FOR LITHIUM SECONDARY BATTERY, METHOD FOR PREPARING THE SAME, AND LITHIUM SECONDARY BATTERY HAVING THE SAME

(75) Inventors: Yang-Kook Sun, Seoul (KR); Hyung Joo Noh, Bucheon-si (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 13/978,067

(22) PCT Filed: Dec. 27, 2011

(86) PCT No.: PCT/KR2011/010173
§ 371 (c)(1),
(2), (4) Date: Oct. 8, 2013

(87) PCT Pub. No.: WO2012/093797
PCT Pub. Date: Jul. 12, 2012

(65) Prior Publication Data
US 2014/0027670 A1 Jan. 30, 2014

(30) Foreign Application Priority Data

Jan. 5, 2011 (KR) .................. 10-2011-0000841
Mar. 10, 2011 (KR) .................. 10-2011-0021579
Nov. 22, 2011 (KR) .................. 10-2011-0122542

(51) Int. Cl.
| | | |
|---|---|---|
| *H01M 4/505* | (2010.01) | |
| *H01M 4/525* | (2010.01) | |
| *C01D 15/02* | (2006.01) | |
| *H01M 4/36* | (2006.01) | |
| *H01M 4/48* | (2010.01) | |
| *H01M 10/052* | (2010.01) | |

(52) U.S. Cl.
CPC ............. *C01D 15/02* (2013.01); *H01M 10/052* (2013.01); *H01M 4/364* (2013.01); *Y02E 60/122* (2013.01); *H01M 4/483* (2013.01); *H01M 4/525* (2013.01); *H01M 4/505* (2013.01)
USPC .................. 252/182.1; 423/594.4; 423/594.6; 423/594.15; 423/599; 429/231.95

(58) Field of Classification Search
USPC ................ 252/182.1; 429/231.95; 423/594.4, 423/594.6, 594.15, 599
See application file for complete search history.

(56) References Cited

U.S. PATENT DOCUMENTS

2012/0080649 A1* 4/2012 Koenig et al. .............. 252/519.2

FOREIGN PATENT DOCUMENTS

| JP | 2009-137834 A | 6/2009 |
|---|---|---|
| JP | 2009-206047 A | 9/2009 |
| KR | 2001-0081181 A | 8/2001 |
| KR | 2003-0033716 A | 5/2003 |
| KR | 2008-0079072 A | 8/2008 |

OTHER PUBLICATIONS

International Search Report of PCT/KR2011/010173 dated Aug. 22, 2012.
G.M. Koenig, Jr, et al; Chemistry of Materials, 23: 1954-1963 (2011).
Z. Chen et al; Materials Research Society, vol. 36: 498-505 (2011).
Y.K. Sun et al; Advanced Functional Materials, 20: 485-491 (2010).
Z. Chen et al; Journal of Materials Chemistry, 20: 7606-7612 (2010).
Y.K. Sun et al; Journal of Materials Chemistry, 21: 10108-10112 (2011).
Y.K. Sun et al; Electrochimica Acta, 55: 8621-8627 (2010).
Y.K. Sun et al; Journal of the Electrochemical Society, 159: A1-A5 (2012).
H.J. Noh et al; Advanced Functional Materials, 23: 1028-1036 (2013).
S.T. Myung et al; Journal of Materials Chemistry, 20: 7074-7095 (2010).
Y.K. Sun et al; Nature Materials, vol. 8: 320-324 (2009).
Y.K. Sun et al: Nature Materials, vol. 11: 942-947 (2012).
H.J. Noh et al; Chemistry of Materials, 25: 2109-2115 (2013).

* cited by examiner

*Primary Examiner* — Peter F Godenschwager
(74) *Attorney, Agent, or Firm* — Lucas & Mercanti, LLP

(57) ABSTRACT

The present invention relates to a cathode active material with whole particle concentration gradient for a lithium secondary battery, a method for preparing same, and a lithium secondary battery having same, and more specifically, to a composite cathode active material, a method for manufacturing same, and a lithium secondary battery having same, the composite cathode active material having excellent lifetime characteristics and charge/discharge characteristics through the stabilization of crystal structure as the concentration of a metal comprising the cathode active material shows concentration gradient in the whole particle, and having thermostability even in high temperatures.

20 Claims, 36 Drawing Sheets

US 8,926,860 B2

CATHODE ACTIVE MATERIAL WITH WHOLE PARTICLE CONCENTRATION GRADIENT FOR LITHIUM SECONDARY BATTERY, METHOD FOR PREPARING THE SAME, AND LITHIUM SECONDARY BATTERY HAVING THE SAME

CROSS REFERENCE TO RELATED APPLICATION

This application is a 371 of PCT/KR2011/010173 filed on Dec. 27, 2011, which claimed the priority of Korean Patent Application No. 10-2011-0000841 filed on Jan. 5, 2011; Korean Patent Application No. 10-2011-0021579 filed Mar. 10, 2011 and Korean Patent Application No. 10-2011-0122542 filed Nov. 22, 2011, the contents of each of which are incorporated herein by reference in their entirety.

FIELD OF THE INVENTION

The present invention relates to a cathode active material with whole particle concentration gradient for a lithium secondary battery, a method for preparing same, and a lithium secondary battery having same, and more specifically, to a cathode active material with whole particle concentration gradient for a lithium secondary battery, a method for preparing same, and a lithium secondary battery having same, which has excellent lifetime characteristics and charge/discharge characteristics through the stabilization of crystal structure without rapid change on the concentration of a metal inside of the cathode active material particle, and has thermostability even in high temperatures.

BACKGROUND OF THE INVENTION

On the strength of recent rapid development of electronics, communications, computer industry, etc., the use of portable electronic devices such as camcorders, mobile phones, notebook PCs and the like becomes generalized. Accordingly, there is increasing demand for batteries which are lightweight and highly reliable, and can be used longer.

In particular, lithium secondary batteries, whose operating voltage is 3.7 V or more, have higher energy density per unit weight than nickel-cadmium batteries and nickel-hydrogen batteries. Accordingly, the demand for the lithium secondary batteries as a power source to drive the portable electronic communication devices is increasing day by day.

Recently, studies on power sources for electric vehicles by hybridizing an internal combustion engine and a lithium secondary battery are actively conducted in the United States, Japan, Europe and the like. The development of a plug-in hybrid (P-HEV) battery used in the car with a mileage of less than 60 miles is actively proceeding around United States. The P-HEV battery is a battery having characteristics, which are nearly the characteristics of an electric vehicle, and the biggest challenge is to develop high-capacity batteries. In particular, the biggest challenge is to develop cathode materials having higher tap density of 2.0 g/cc or more and high capacity characteristics of 230 mAh/g or more.

The materials, which are currently available or under development, are $LiCoO_2$, $LiNiO_2$, $LiMnO_2$, $LiMn_2O_4$, $Li_{1+x}[Mn_{2-x}M_x]O_4$, $LiFePO_4$ and the like. Of them, the $LiCoO_2$ is an excellent material having stable charge/discharge characteristics, excellent electronic conductivity, high cell voltage, high stability and even discharge voltage characteristics. However, because Co has low reserves and is expensive and toxic to the human body, it is needed to develop other cathode materials. Further, it has a defect of very poor thermal properties by unstable crystal structure by delithiation during discharging.

In order to improve it, there may be many attempts to shift the exothermic onset temperature to the side of the higher temperature and to make an exothermic peak broad in order to prevent rapid heat-emitting, by substitute a part of the nickel with transition metals. However, there is no satisfactory result yet.

Namely, $LiNi_{1-x}Co_xO_2$ (x=0.1-0.3) material, wherein a part of the nickel is substituted with cobalt, shows excellent charge/discharge characteristics and lifetime characteristics, but the thermostability problem is not solved yet. Furthermore, European Patent No. 0872450 discloses $Li_aCo_bMn_cM_dNi_{1-(b+c+d)}O_2$ (M=B, Al, Si. Fe, Cr, Cu, Zn, W, Ti, Ga)-type, where the Ni is substituted with other metals as well as Co and Mn, but the thermostability of the Ni-based material is not solved yet.

In order to eliminate these shortcomings, Korean Patent Publication No. 2005-0083869 suggests lithium-transition metal oxides having metal composition representing concentration gradient. This method is a method that an internal materials with a certain composition is synthesized and materials with other composition is coated on the exterior thereof to obtain a bi-layer, and is mixed with a lithium salt followed by heat-treatment. The internal material may be commercially available lithium transition metal oxides. However, this method has a problem that the internal structure is unstable because the metal composition of the cathode active material between the produced internal material and the external material is discontinuously changed, and is not continuously and gradually changed. Further, the powder synthesized by the invention, which does not use ammonia as a chelating agent, was not suitable for a cathode active material for a lithium secondary battery due to its lower tap density.

In order to improve this problem, Korean Patent Publication No. 2007-0097923 suggests a cathode active material, which has an internal bulk part and an external bulk part, and the metal ingredients have continuous concentration distribution depending on their position at the external bulk part. However, in this method, there was a need to develop a cathode active material of a new structure having better stability and capacity because the concentration is constant at the internal bulk part and the metal composition is changed at the external bulk part.

SUMMARY OF THE INVENTION

In order to solve the above-described problems associated with prior art, the present invention is objected to provide a cathode active material with whole particle concentration gradient for a lithium secondary battery, which has excellent lifetime characteristics and charge/discharge characteristics through the stabilization of crystal structure, and has thermostability even in high temperatures.

Further, the present invention is objected to provide a method for preparing the cathode active material for lithium secondary battery.

Further, the present invention is objected to provide a lithium secondary battery including the cathode active material.

In order to accomplish one object of the present invention, the present invention provides, in a cathode active material for a lithium secondary battery, a cathode active material with whole particle concentration gradient for a lithium secondary battery, wherein the concentration of a metal making up the cathode active material shows continuous concentration gradient in the entire region, from the particle core to the surface part.

The cathode active material for a lithium secondary battery is characterized that it may comprise:

the core expressed by the following formula 1; and
the surface part expressed by the following formula 2,
wherein the concentration of the M1 is constant from the core to the surface part; and
the concentration of the M2 and the concentration of the M3 have continuous concentration gradient from the core to the surface.

   [Formula 1]

   [Formula 2]

(in the formulas 1 and 2, M1, M2 and M3 are selected from the group consisting of Ni, Co, Mn and a combination thereof; M4 is selected from the group consisting of Fe, Na, Mg, Ca, Ti, V, Cr, Cu, Zn, Ge, Sr, Ag, Ba, Zr, Nb, Mo, Al, Ga, B and a combination thereof; $0<a1\leq1.1$, $0<a2\leq1.1$, $0\leq x\leq1$, $0\leq y1\leq1$, $0\leq y2\leq1$, $0\leq z1\leq1$, $0\leq z2\leq1$, $0\leq w\leq0.1$, $0\leq\delta\leq0.02$, $0<x+y1+z1\leq1$, $0<x+y2+z2\leq1$, and $y1\leq y2$, $z2\leq z1$.)

Further, the present invention provides a method for preparing the cathode active material for a lithium secondary battery comprises:

a first step of preparing a metal salt aqueous solution for forming the core and a metal salt aqueous solution for forming the surface part, which contain the M1, the M2 and the M3 as a metal salt aqueous solution, wherein the concentration of the M1 is the same each other, and the concentration of the M2 and the concentration of the M3 are different each other;

a second step of forming precipitates by mixing the metal salt aqueous solution for forming the core and the metal salt aqueous solution for forming the surface part at a mixing ratio from 100 v %:0 v % to 0 v %:100 v % with gradual change and by mixing a chelating agent and a basic aqueous solution to a reactor at the same time, wherein the concentration of the M1 is constant from the core to the surface part, and the concentrations of the M2 and the M3 have continuous concentration gradient from the core to the surface part;

a third step of preparing an active material precursor by drying or heat-treating the obtained precipitates; and a fourth step of mixing the active material precursor and a lithium salt and then heat-treating thereof.

Further, the present invention provides a lithium secondary battery comprising the cathode active material.

Advantageous Effects of the Invention

In the cathode active material for a lithium secondary battery according to the present invention, the concentration of one metal is constant from the core to the surface part, and the concentrations of the other two metals are increased or decreased with continuous concentration gradient from the core to the surface part. Accordingly, the crystal structure of the particle is stabilized and the thermostability is increased because there is no phase boundary having rapid concentration change from the particle core to the surface part.

Accordingly, the lithium secondary battery having the cathode active material shows excellent capacity characteristics as well as excellent lifetime characteristics and charge/discharge characteristics, and has thermostability even in high temperatures. Particularly, when the Ni concentration of the cathode active material according to the present invention, which shows the whole particle concentration gradient, is maintained constantly, a stable active material showing high capacity can be prepared.

BRIEF DESCRIPTION OF DRAWINGS

The above and other objects and features of the present invention will become apparent from the following description of the invention taken in conjunction with the following accompanying drawings, which respectively show.

DETAILED DESCRIPTION OF THE INVENTION

Figure 1:
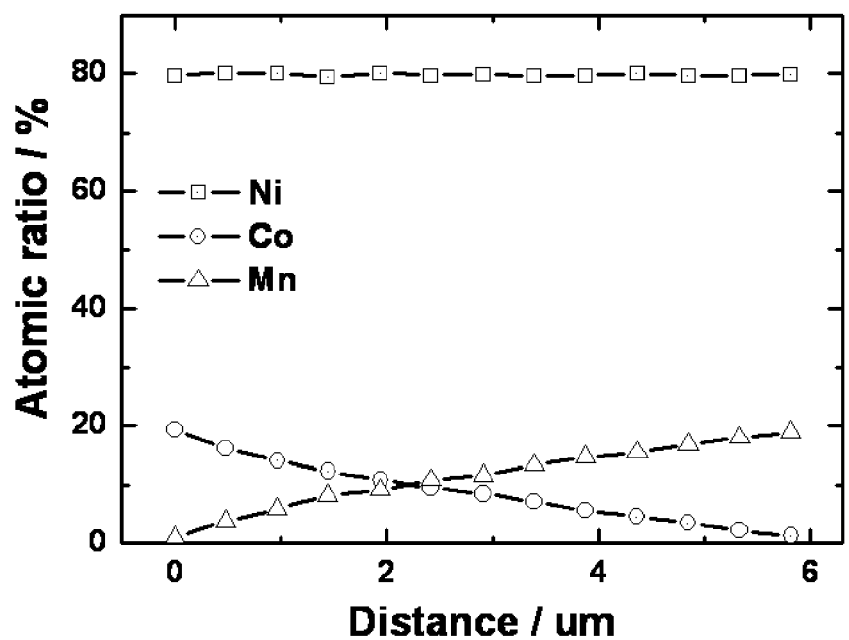
FIGS. 1 to 5: the results measuring the atomic ratio in each precursor particle prepared in Examples 1-1 to 1-5 of the present invention, respectively.
Figure 2:
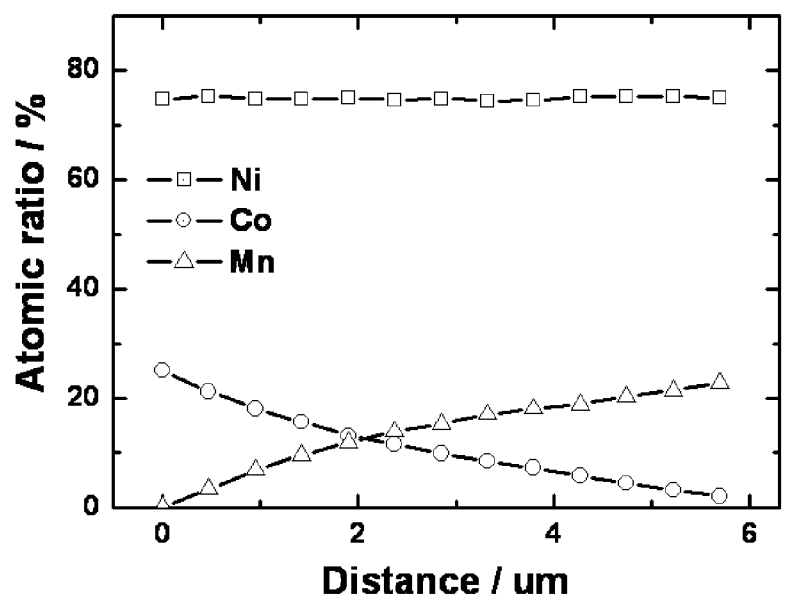
Figure 3:
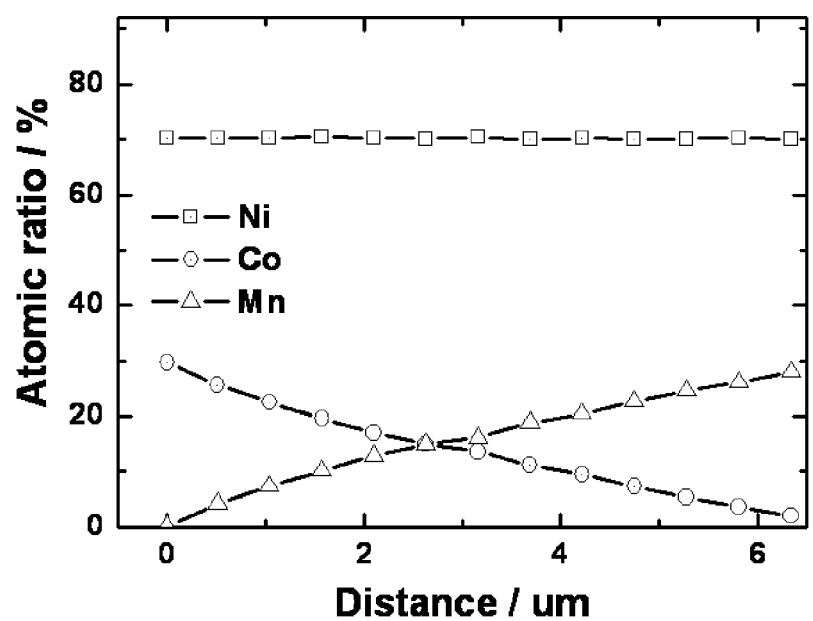
Figure 4:
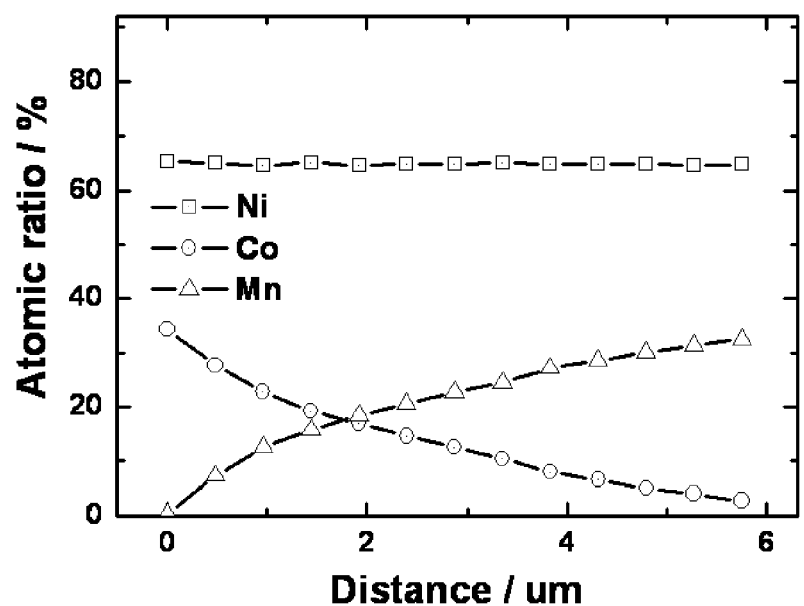

Hereinafter, the present invention will be described in detail.

Unlike the prior art that the metal concentration is constant at the interior region, but the metal concentration shows gradual concentration gradient at the exterior region, in the cathode active material of the present invention, a part of the metal shows continuous concentration gradient at the whole region from the particle core to the surface part, but the other one metal shows constant metal concentration at the whole region from the particle core to the surface part.

In the cathode active material particle of the present invention, one of metals making up the cathode active material shows constant metal concentration at the whole region from the particle core to the surface part, but the other two metals show decreased or increased continuous concentration gradient at the whole region from the particle core to the surface part.

Namely, the present invention is characterized that the concentration of the M2 is increased with continuous concentration gradient from the core to the surface part, and the concentration of the M3 is decreased with continuous concentration gradient from the core to the surface part.

In the present invention, "metal concentration shows continuous concentration gradient" refers that the concentration of metal except for lithium exists with concentration distribution, which is changed gradually from the core of the active material particle to the surface part. The concentration gradient refers that there may be metal concentration difference of 0.1 to 30 mol %, preferably 0.1 to 20 mol %, more preferably 1 to 10 mol % per 0.1 μm, from the particle core to the surface part. In the present invention, the particle core refers to the range within the diameter 0.2 μm from the center of the active material particle, and the particle surface part refers to the range within the diameter 0.2 μm from the outermost of the particle.

The present invention is characterized that the concentration gradients of the M2 and the M3 should be constant from the particle core to the surface, i.e., the concentrations of the M2 and the M3 may be continuously changed at the whole particle, preferably.

The present invention is characterized that the M1 is Ni, the M2 is Mn and the M3 is Co. The Ni concentration is maintained constantly so as to obtain high capacity, and the Mn concentration becomes increased at the surface and the Co concentration becomes decreased at the surface so as to obtain higher stability.

In the present invention, the constant concentration range of the M1, i.e., Ni, x may be $0.4 \leq x \leq 1$, and it is more preferred that the Ni concentration should be maintained at high concentration of $0.6 \leq x \leq 0.9$.

In the present invention, when the M1 is Ni, the concentration difference of the Co and the Mn between the particle core and the particle surface may be $0.2 \leq |y2-y1| \leq 0.4$, $0.2 \leq |z2-z1| \leq 0.4$, preferably, because there may be no rapid concentration change. And the concentrations of the Mn and the Co at the surface may be $0.2 \leq y2 \leq 0.4$, $0 \leq z2 \leq 0.1$, preferably. The Mn content at the surface should be 0.2 or more to obtain thermostability and to prevent capacity reduction.

The present invention is characterized that the M1 is Co, the M2 is Mn and the M3 is Ni.

The present invention is characterized that the M1 is Mn, the M2 is Co and the M3 is Ni.

Hereinafter, the method for preparing the cathode active material of the present invention will be described.

First of all, a metal salt aqueous solution for forming the core and a metal salt aqueous solution for forming the surface part, which contain the M1, the M2 and the M3 as a metal salt aqueous solution, wherein the concentration of the M1 is the same each other, and the concentration of the M2 and the concentration of the M3 are different each other, are prepared. The present invention is characterized that in order to constantly maintain the concentration of the M1 in the whole particle, the M1 concentration may be maintained same at the metal salt aqueous solution for forming the core and the metal salt aqueous solution for forming the surface part.

The metal salt aqueous solution for forming the core and the metal salt aqueous solution for forming the surface part may be prepared by adding nickel salt, cobalt salt, manganese salt and salts containing M to a solvent, or may be prepared by preparing aqueous solution containing nickel salt, cobalt salt, manganese salt and salts containing M, respectively followed by mixing thereof for using. The metal salt may be sulfate, nitrate, acetate, halide, hydroxide and the like, and it may be any salt, which can be dissolved in water, without particular limitation.

Then, the metal salt aqueous solution for forming the core and the metal salt aqueous solution for forming the surface part are mixed together and simultaneously, the chelating agent and the basic aqueous solution are mixed in a reactor so as to obtain a precipitate wherein the M1 concentration is constant from the core to the surface, and the M2 and M3 concentrations have continuous concentration gradients from the core to the surface part. Namely, the metal salt aqueous solution for forming the core and the metal salt aqueous solution for forming the surface part are mixed at the mixing ratio, which is gradually changed from 100 v %:0 v % to 0 v %:100 v %, and simultaneously, the chelating agent and the basic aqueous solution are mixed in a reactor, so as to form a precipitate, wherein the M1 concentration is constant from the core to the surface, and the M2 and M3 concentrations have continuous concentration gradients from the core to the surface part.

In the present invention, a precipitate having continuous concentration gradient from the particle core to the surface part, from the particle forming process through one coprecipitation process, by mixing the metal salt aqueous solution for forming the core and the metal salt aqueous solution for forming the surface part from the initial stage of the particle forming process and supplying thereof continuously at the same time. The produced concentration gradient and its gradient may be controlled according to the compositions and the mixing ratio of the metal salt aqueous solution for forming the core and the metal salt aqueous solution for forming the surface part. The entire particle size may be controlled by adjusting the reaction time to 1 to 10 hours.

Further, the present invention is characterized that the molar ratio of the chelating agent and the metal salt may be 0.2 to 1.0:1.

The chelating agent may be ammonia aqueous solution, ammonium sulfate aqueous solution and a combination thereof. It is preferred that the molar ratio of the chelating agent and the metal salt may be 0.2 to 0.5:1, 0.2 to 0.4:1. The reason to set the molar ratio of the chelating agent to 0.2 to 1.0 based on the metal aqueous solution 1 mole, is that the chelating agent forms a complex by reacting with metal at the ratio of 1:1 or more, but the chelating agent remained after the reaction of sodium hydroxide and the complex may be changed to intermediates and then recovered as the chelating agent. Furthermore, the reason is that it is the best condition for improving and stabilizing the crystallinity of the cathode active material.

The concentration of the basic aqueous solution may be 2 M to 10 M, preferably. If the concentration of the basic aqueous solution is less than 2 M, particle forming may take longer, tap density may be deteriorated, and the yield of the co-precipitation reaction product may be reduced. And, if the concentration is over 10 M, it is not preferred because it may be difficult to form homogeneous particles due to rapid particle growth by rapid reaction, and the tap density may be also reduced.

In the second step, the reaction atmosphere of the transition metal aqueous solution may be under a nitrogen flow, pH may be within 10 to 12.5, reaction temperature is within 30 to 80° C., and reaction stirring speed may be within 100 to 2000 rpm, preferably.

Then, in the third step, the obtained precipitate may be dried or heat-treated to prepare an active material precursor. The drying process may be conducted at 110° C. to 400° C. for 15 to 30 hours.

Finally, the active material precursor and the lithium salt are mixed and then heat-treated to obtain an active material.

It is preferred that the heat-treating process after mixing the active material precursor and the lithium salt may be conducted at 700° C. to 1100° C. The heat-treating atmosphere may be in an oxidative atmosphere of air or oxygen or a reductive atmosphere of nitrogen or hydrogen, preferably, and the heat-treating time may be 10 to 30 hours, preferably. During this heat-treating process, metal may be diffused even at the part where the internal metal concentration is constant at the initial stage of the particle forming process, and consequently, a metal oxide having continuous metal concentration distribution from the core to the surface part in the whole particle may be obtained.

Before the heat-treating process, a pre-calcining process may be conducted by maintaining at 250 to 650° C. for 5 to 20 hours. Further, after the heat-treating process, an annealing process may be conducted at 600 to 750° C. for 10 to 20 hours.

Further, the present invention may further include a step of adding sintering additives when mixing the active material precursor and the lithium salt, preferably. The sintering additives may be any one selected from the group consisting of compounds containing ammonium ion, metal oxides, metal halides and a combination thereof, preferably.

The compounds containing ammonium ion may be any one selected from the group consisting of $NH_4F$, $NH_4NO_3$, $(NH_4)_2SO_4$, and a combination thereof, preferably; the metal oxides may be any one selected from the group consisting of $B_2O_3$, $Bi_2O_3$, and a combination thereof, preferably; and the metal halides may be any one selected from the group consisting of $NiCl_2$, $CaCl_2$, and a combination thereof, preferably.

The sintering additives may be used in an amount of 0.0~10.2 mole based on the active material precursor 1 mole, preferably. If the amount of the sintering additives is too low, the sintering effect of the active material precursor may not be improved a lot, and if the amount is higher than the said range, the initial capacity during charging/discharging may be reduced or the performance of the cathode active material may be deteriorated.

Further, the present invention provides a lithium secondary battery including the cathode active material according to the present invention.

The lithium battery may include a cathode including the cathode active material having the above constitution, an anode including anode active material and a separator existing between thereof. Further, it may include an electrolyte, which is immersed in the cathode, the anode and the separator. The anode active material may be a material which can reversibly absorb or release lithium ions, preferably, for example, a material including artificial graphite, natural graphite, graphitized carbon fiber, Amorphous Carbon, and metal lithium also can be used as an anode active material.

The electrolyte may be a liquid electrolyte containing lithium salts and non-aqueous organic solvent, or polymer gel electrolyte.

Hereinafter, the present invention is explained by the following Examples and Test Examples in more detail. The following Examples and Test Examples are intended to further illustrate the present invention, and the scope of the present invention cannot be limited thereby in any way.

EXAMPLE 1

Case of Constant Nickel Concentration

EXAMPLE 1-1

In order to prepare a compound, wherein the Ni concentration is constant from the core to the surface, the Co concentration is decreased, and the Mn concentration is increased, a 2.4 M metal aqueous solution, prepared by mixing nickel sulfate and cobalt sulfate at the molar ratio of 80:20, as a metal salt aqueous solution for forming the core and a metal aqueous solution containing nickel sulfate and manganese sulfate at the molar ratio of 80:20 as a metal salt aqueous solution for forming the surface part were prepared.

Distilled water 4 L was put into a coprecipitation reactor (Capacity: 4 L, power of a rotation motor: 80 W); nitrogen gas was supplied to the reactor at the speed of 0.5 L/min so as to remove dissolved oxygen; and stirred at 1000 rpm while maintaining the temperature of the reactor at 50° C.

The metal salt aqueous solution for forming the core and the metal salt aqueous solution for forming the surface part were mixed at a certain ratio, and simultaneously supplied into the reactor at the rate of 0.3 L/hour. Further, 3.6 M ammonia solution was continuously supplied into the reactor at the rate of 0.03 L/hour. Further, for adjusting pH, 4.8 M NaOH aqueous solution was supplied to maintain pH in the reactor at 11. Then, the impeller speed of the reactor was controlled to 1000 rpm, and the co-precipitation reaction was conducted until the diameter of the obtained precipitate became 1 μm. At this time, the flow rate was controlled to make the average retention time of the solution in the reactor about 2 hours, and after the reaction reached to the steady state, the reactant was kept at the steady state for a certain time to so as to obtain a co-precipitated compound having higher density. The compound was filtered, washed with water, and dried with 110° C. warm air dryer for 15 hours so as to obtain an active material precursor.

$LiNO_3$ as a lithium salt was mixed to the obtained active material precursor, heated at a rate of 2° C./min, and then pre-calcined by maintaining at 280° C. for 10 hours followed by calcining at 750° C. for 15 hours to obtain a final active material particle. The size of the finally obtained active material particle was 12 μm.

EXAMPLE 1-2 to EXAMPLE 1-4

In order to prepare a compound, wherein the Ni concentration is constant from the core to the surface, the Co concentration is decreased and the Mn concentration is increased, the procedure of Example 1 was repeated except for mixing nickel sulfate, cobalt sulfate and manganese sulfate of the metal salt aqueous solution for forming the core and the metal salt aqueous solution for forming the surface part at the molar ratio as listed in the following Table 1 so as to obtain an active material particle.

EXAMPLE 1-5

A cathode active material, which has the same composition and the same structure with Examples 1-3 was prepared by using a batch reactor.

Distilled water 2.5 L was put into a coprecipitation batch reactor (Capacity: 8 L, power of a rotation motor: 180 W); nitrogen gas was supplied to the reactor at the speed of 0.6 L/min so as to remove dissolved oxygen; and stirred at 450 rpm while maintaining the temperature of the reactor at 50° C.

The metal salt aqueous solution for forming the core and the metal salt aqueous solution for forming the surface part having the same concentration with Example 1-3 were mixed at a certain ratio, and simultaneously supplied into the reactor at the rate of 0.2 L/hour. Further, 4.8 M ammonia solution was continuously supplied into the reactor at the rate of 0.1 L/hour. Further, for adjusting pH, 10 M NaOH aqueous solution was supplied to maintain pH in the reactor at 11. Then, the impeller speed of the reactor was controlled to 450 rpm, and the reaction solution was supplied until the total amount of the initially added distilled water, the added metal aqueous solution, the ammonia solution and the NaOH solution became 8 L. The compound was filtered, washed with water, and dried with 110° C. warm air dryer for 15 hours so as to obtain an active material precursor.

$LiNO_3$ as a lithium salt was mixed to the obtained active material precursor, heated at a rate of 2° C./min, and then pre-calcined by maintaining at 280° C. for 10 hours followed by calcining at 750° C. for 15 hours to obtain a final active material. The size of the finally obtained active material particle was 12 μm

TABLE 1

| | Metal salt aqueous solution for forming the core | | | Metal salt aqueous solution for forming the surface part | | |
|---|---|---|---|---|---|---|
| | Ni | Co | Mn | Ni | Co | Mn |
| Example 1-1 | 80 | 20 | 0 | 80 | 0 | 20 |
| Example 1-2 | 75 | 25 | 0 | 75 | 02 | 23 |
| Example 1-3 | 70 | 30 | 0 | 70 | 02 | 28 |
| Example 1-4 | 65 | 35 | 0 | 65 | 02 | 33 |
| Example 1-5 | 70 | 30 | 0 | 70 | 02 | 28 |

COMPARATIVE EXAMPLE

A cathode active material, wherein the molar ratio of the nickel, the cobalt and the manganese is as listed in the following Table 2, respectively, and each concentration in the whole active material is not changed so as to have constant composition, was prepared.

TABLE 2

| | Ni | Co | Mn |
|---|---|---|---|
| Comparative Example 1-1 | 80 | 07 | 13 |
| Comparative Example 1-2 | 75 | 07 | 18 |
| Comparative Example 1-3 | 70 | 09 | 21 |
| Comparative Example 1-4 | 65 | 10 | 25 |

TEST EXAMPLE 1-1

Confirmation of Formation of Concentration Gradient in Precursor Particle

In order to confirm the concentration gradient structure of each metal from the core to the surface of the precursor particle of the present invention, the atomic ratio in each precursor particle prepared in Examples 1-1 to 1-5 was measured by using EPMA (Electron Probe Micro Analyzer) while moving form the core to the surface part, and the results are shown in FIGS. 1 to 5, respectively.

In FIGS. 1 to 4, it was confirmed that the Ni metal concentration from the core to the surface was constant, and there was concentration gradient, where the Mn concentration was gradually increased with certain gradient, but the Co concentration was gradually decreased with certain gradient.

Figure 5:
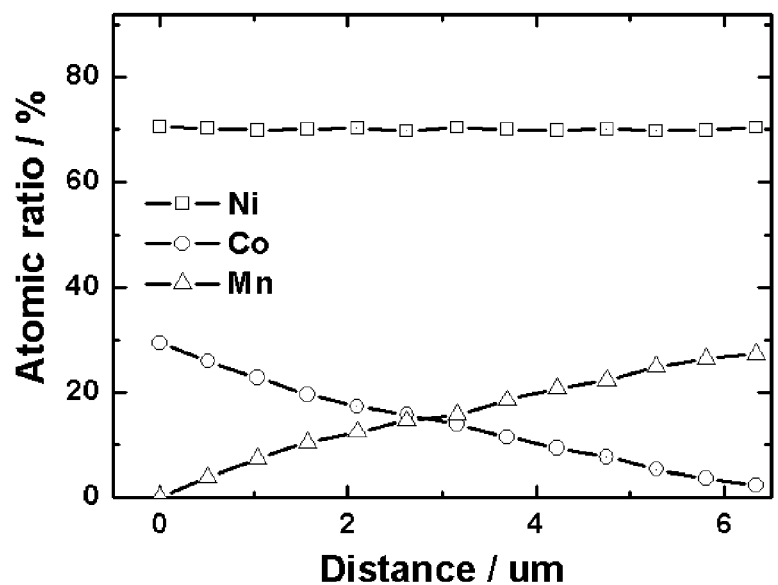
Figure 6:
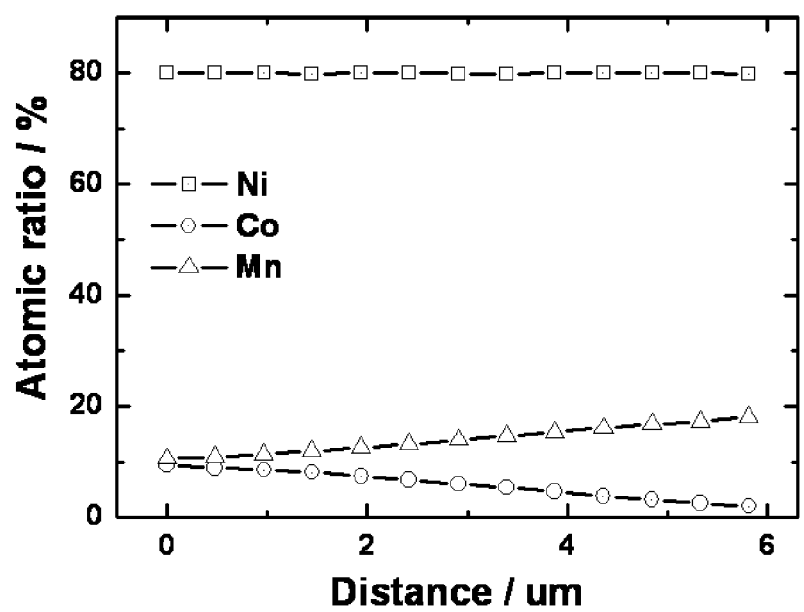
FIGS. 6 to 10: the results measuring the atomic ratio in each precursor particle prepared in Examples 1-1 to 1-5 of the present invention after heat-treating, respectively.
Figure 7:
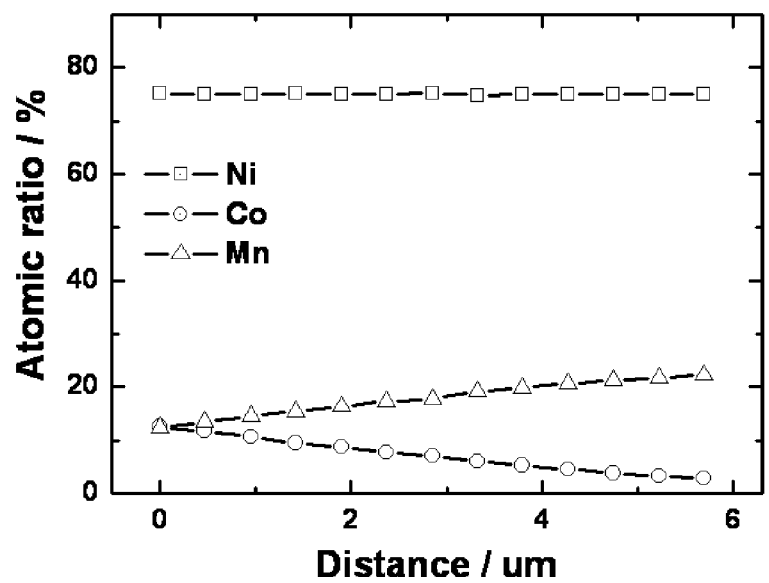
Figure 8:
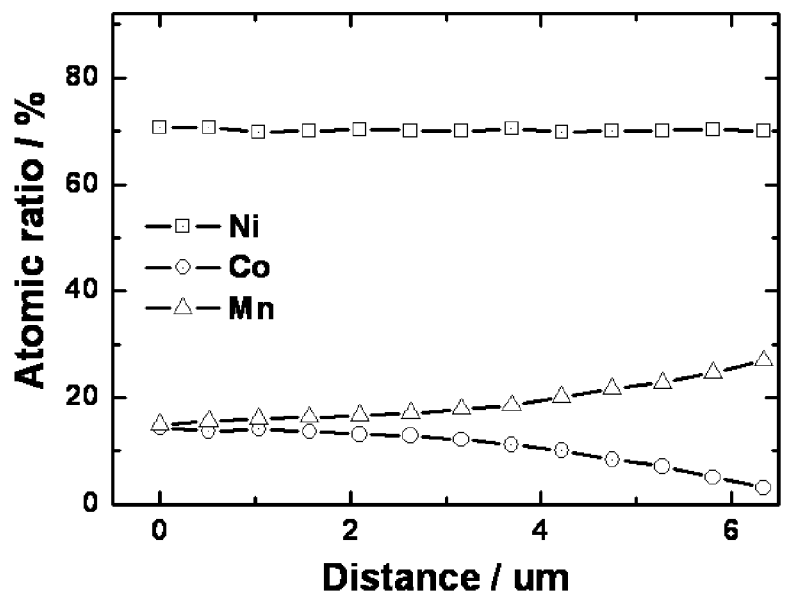
Figure 9:
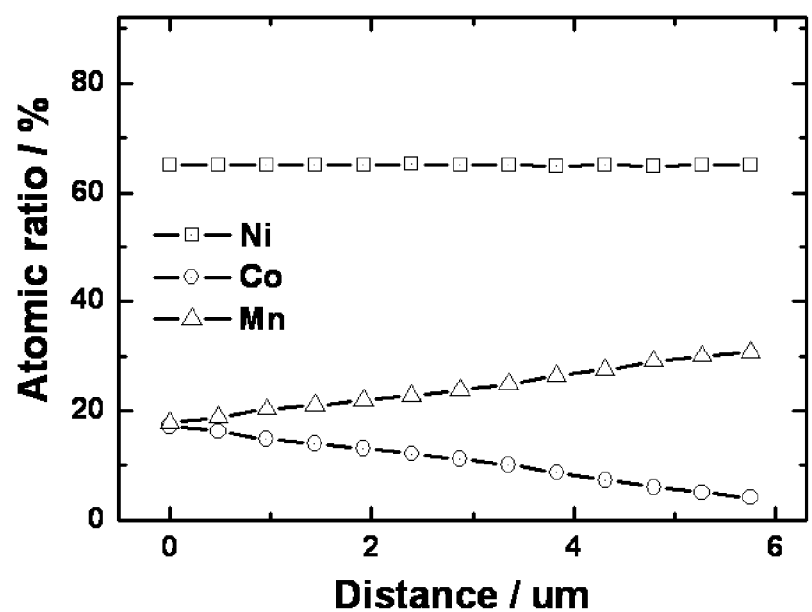

Further, for Example 1-5 prepared by using the batch type reactor, as shown in FIG. 5, it was confirmed that the Ni metal concentration from the core to the surface was constant, and there was concentration gradient, where the Mn concentration was gradually increased with certain gradient, but the Co concentration was gradually decreased with certain gradient.

TEST EXAMPLE 1-2

Confirmation of Formation of Concentration Gradient in Active Material Particle After Heat-treatment In order to confirm whether each metal shows concentration gradient from the particle core to the surface part after heat-treating the precursor of the present invention, the particles prepared in Examples 1-1 to 1-5 were heat-treated. And then the atomic ratio was measured by using EPMA (Electron Probe Micro Analyzer) while moving from the core to the surface, and the results are shown in FIGS. 6 to 10, respectively.

In FIGS. 6 to 9, it could be confirmed that: the Ni metal concentration was constant from the core to the surface, and the precursor showed the concentration of the aqueous solution for forming the core; but after heat-treatment, the Co and Mn concentrations in the core were same each other, and later there was concentration gradient, where the Mn concentration was gradually increased with certain gradient, but the Co concentration was gradually decreased with certain gradient.

Figure 10:
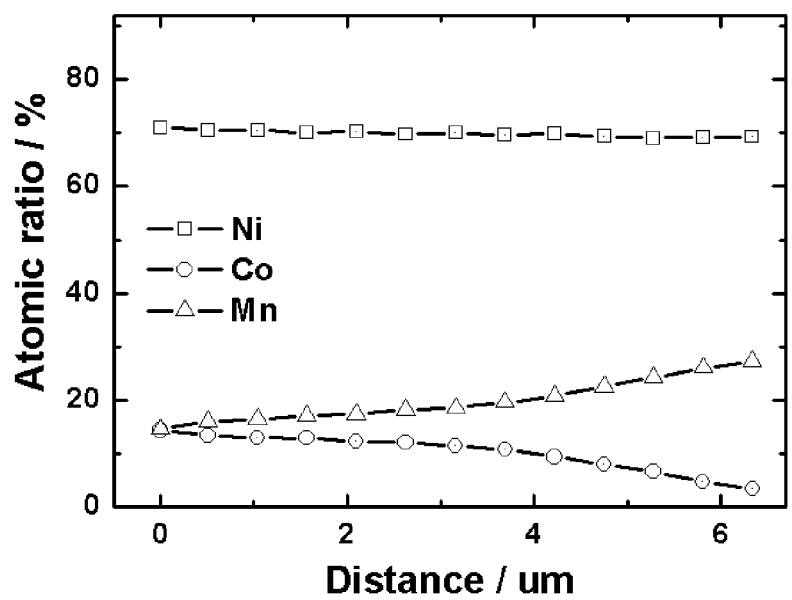
Figure 11:
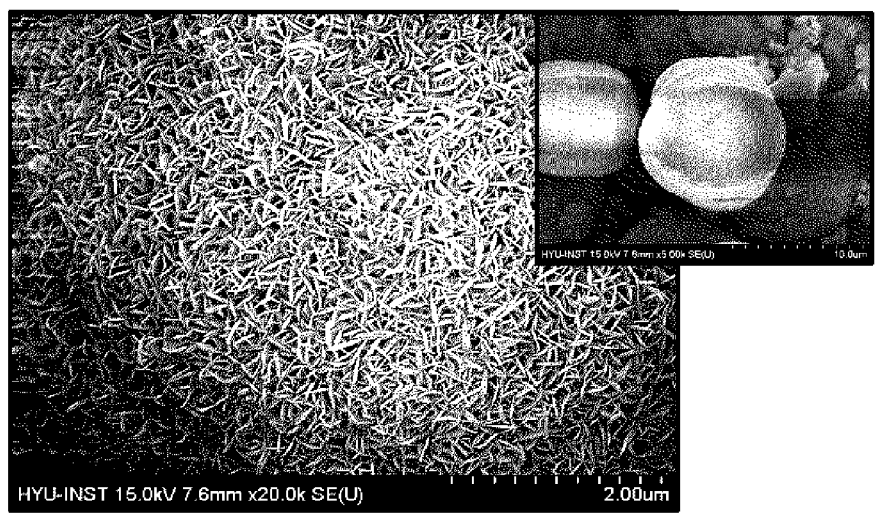
FIGS. 11 to 15 and FIGS. 16 to 20: the surface images of each precursor particle and the final active material prepared in Examples 1-1 to 1-5 of the present invention measured by scanning electron microscope, respectively.
Figure 12:
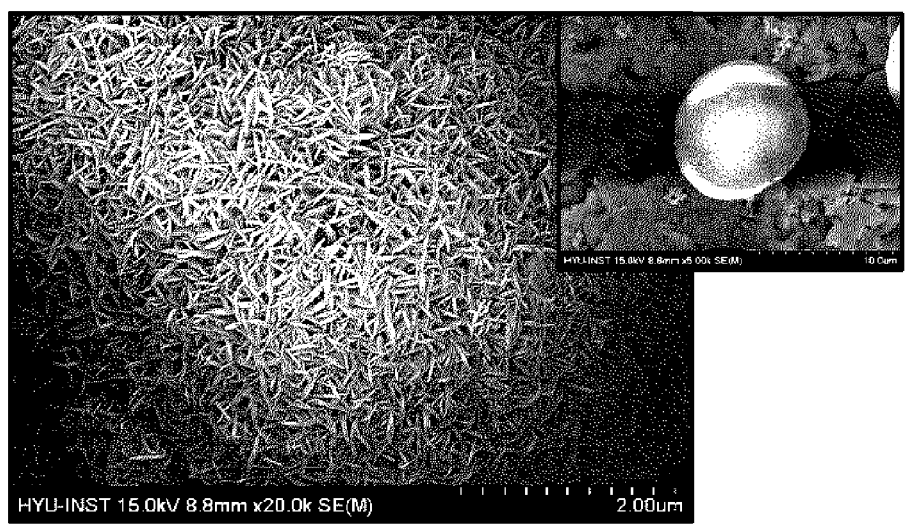
Figure 13:
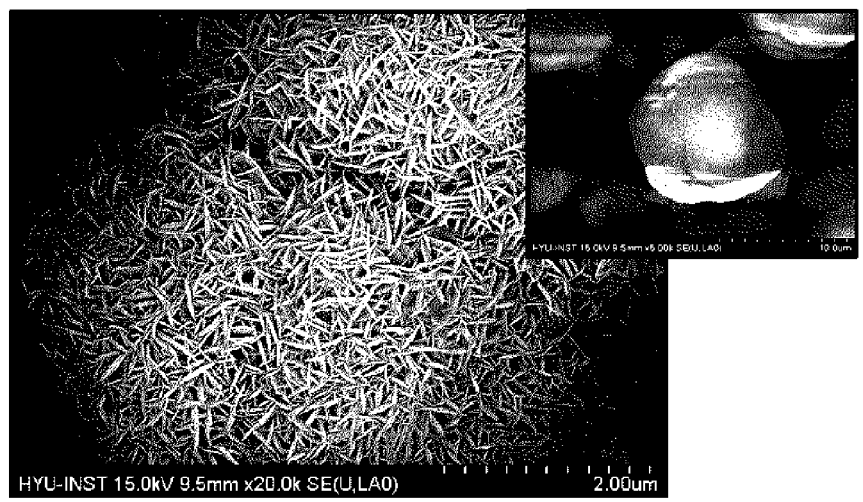
Figure 14:
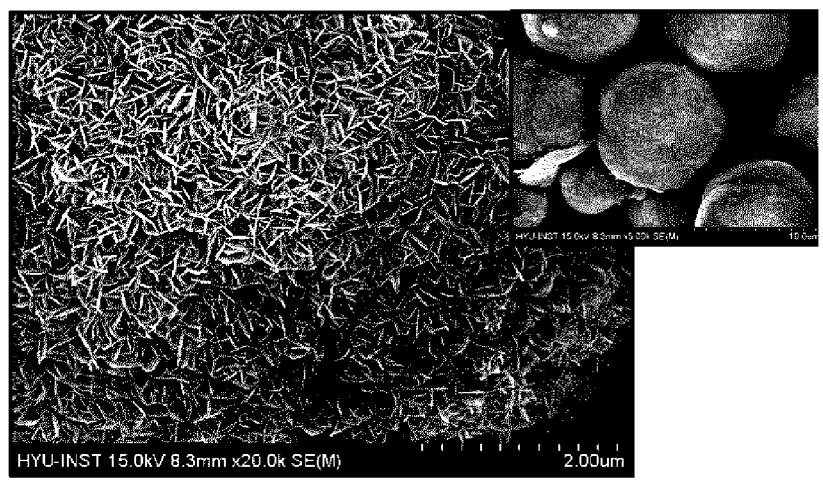
Figure 15:
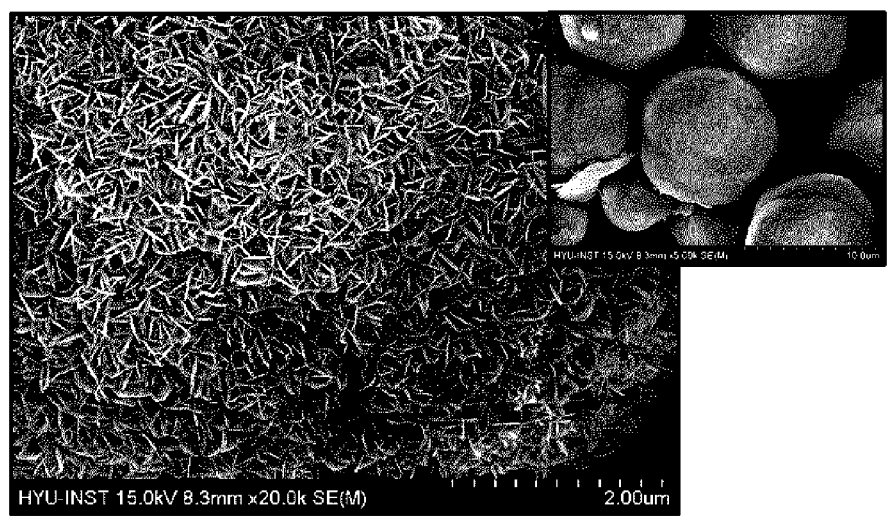
Figure 16:
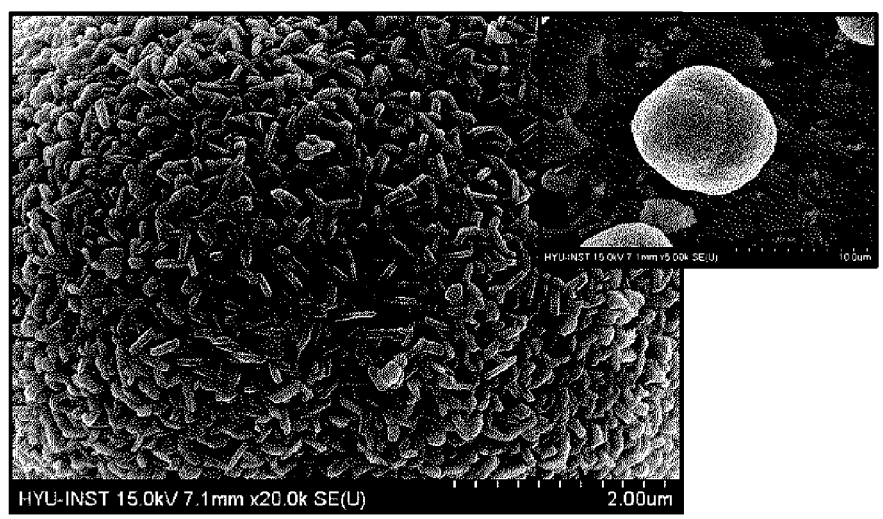
Figure 17:
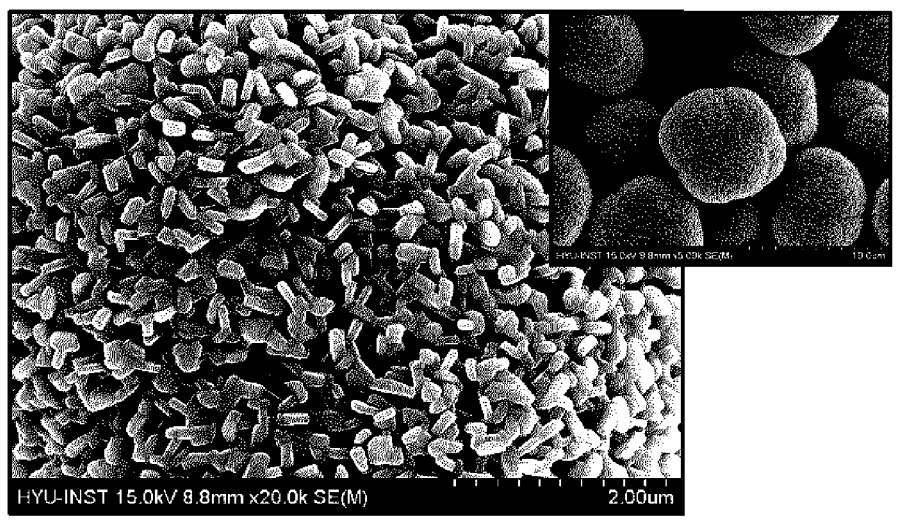
Figure 18:
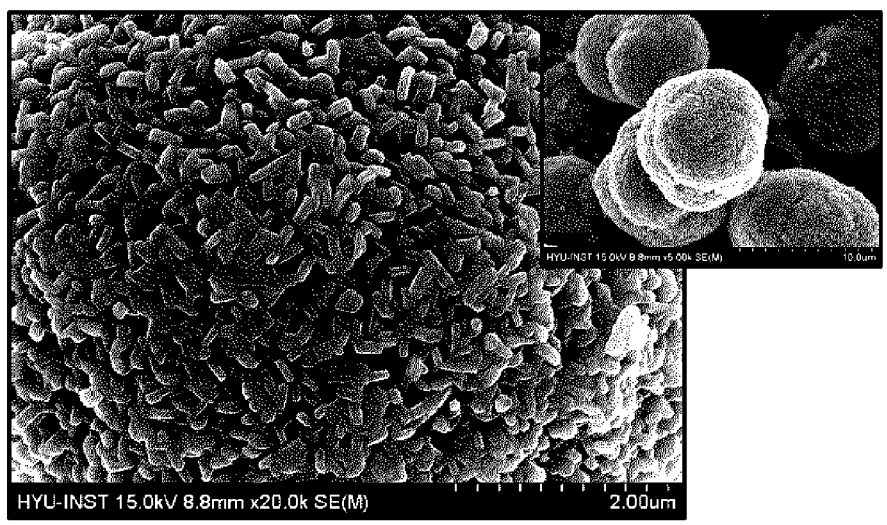
Figure 19:
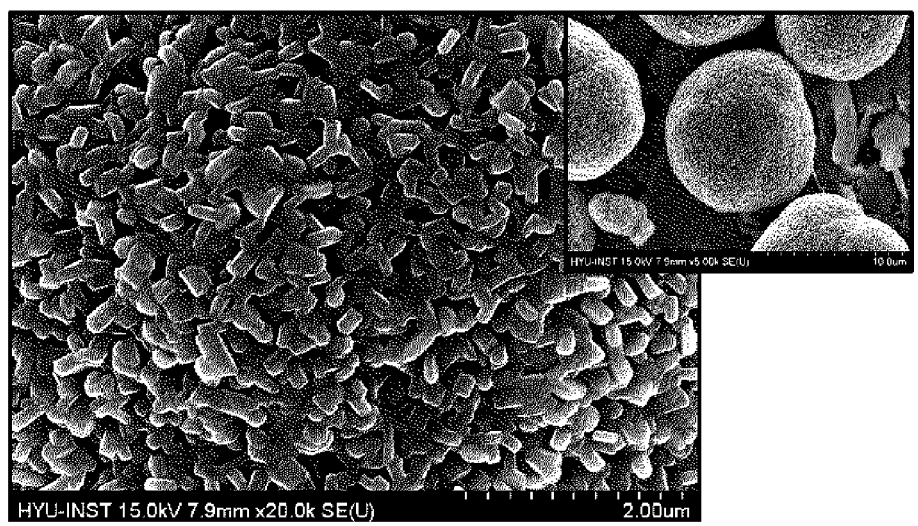
Figure 20:
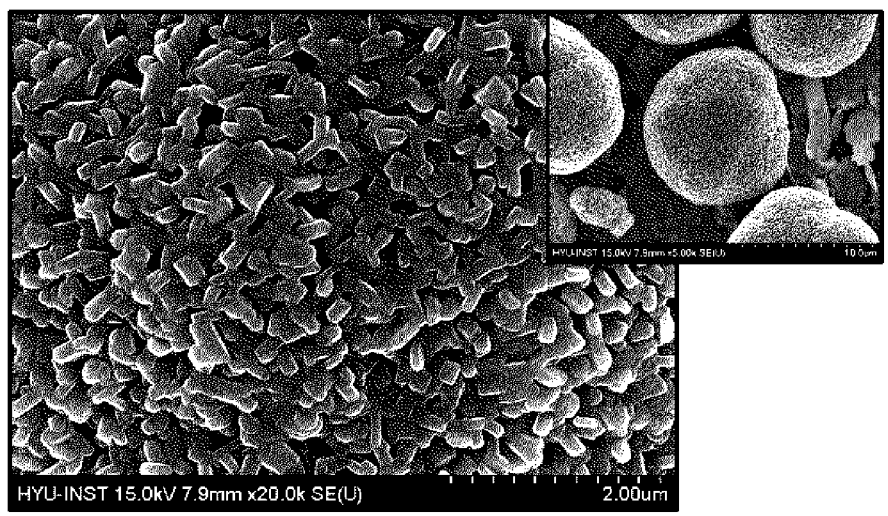
Figure 21:
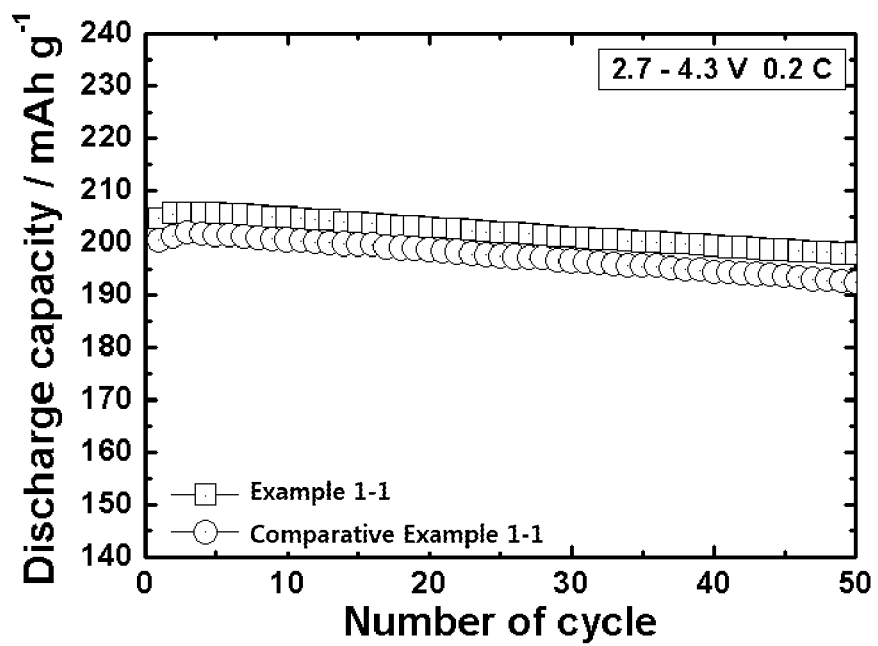
FIGS. 21 to 24: the results of charging/discharging test and the results measuring cycle characteristics of each battery prepared by using the active material prepared in Examples 1-1 to 1-4 of the present invention, respectively.
Figure 22:
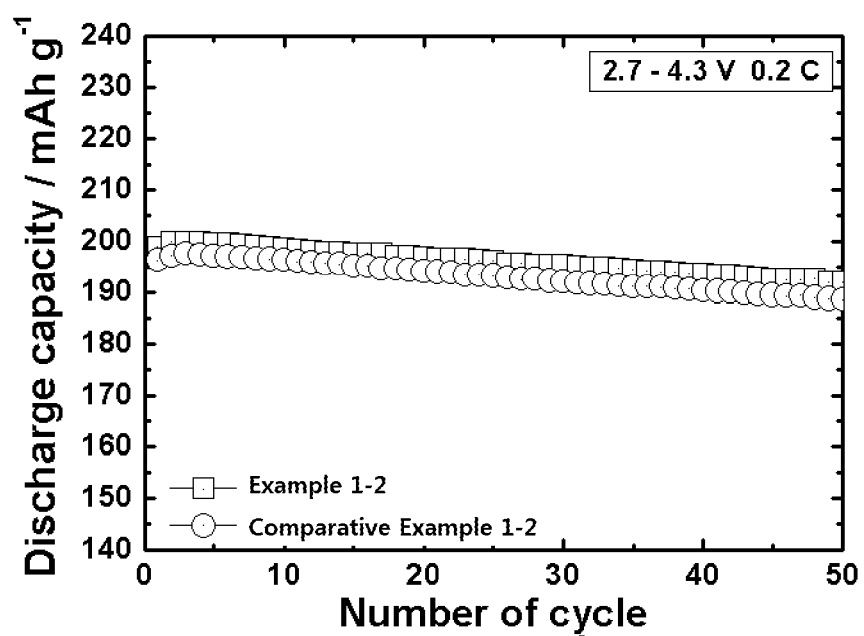
Figure 23:
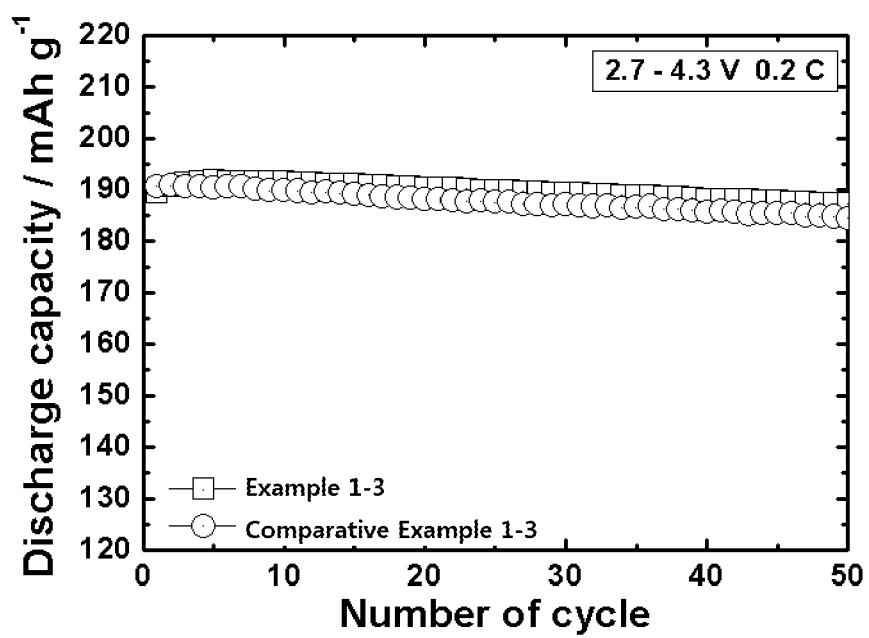
Figure 24:
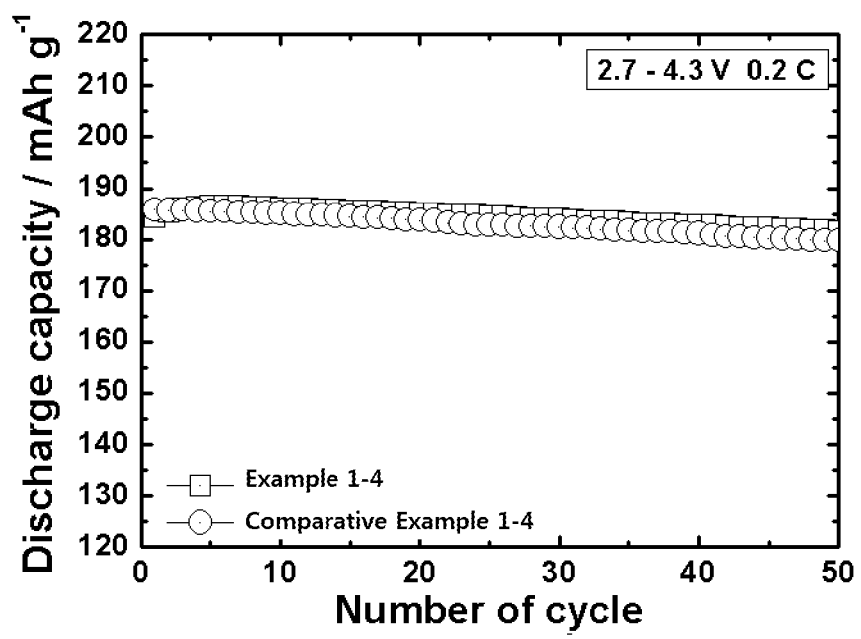

Further, as shown in FIG. 10, for Example 1-5 prepared by using the batch type reactor, it was confirmed that the Ni metal concentration from the core to the surface was constant, and there was concentration gradient, where the Mn concentration was gradually increased with certain gradient, but the Co concentration was gradually decreased with certain gradient.

In FIGS. 6 to 10, unlike the precursor, becoming the concentrations of the Mn and the Co in the core the same was resulted from diffusion between metal salts in the heat-treatment process.

TEST EXAMPLE 1-3

Confirmation of Surface Image of Particles of Precursor and Active Material

Surface images of the precursors and the final active materials prepared in Examples 1-1 to 1-5 were taken by using a scanning electron microscope, and the results are shown in FIGS. 11 to 15 and FIGS. 16 to 20.

Each of the pictures is a surface image with different magnification, and it could be confirmed that each particle was homogeneously formed.

TEST EXAMPLE 1-4

Measuring Charging/Discharging Capacity and Cycle Characteristics

Cathodes were prepared by using the active materials prepared in Examples 1-1 to 1-5 and the active materials prepared in Comparative Examples 1-1 to 1-4, and applied to cylindrical lithium secondary batteries, respectively.

For the batteries prepared by using the active materials prepared in Examples 1-1 to 1-4, charging/discharging test and cycle characteristics were measured, and the results are shown in FIGS. 21 to 24. The charging/discharging was conducted 10 times per each sample at the condition of 2.7~4.3 V and 0.2 C, and the average value was taken.

In FIGS. 21 to 24, Example 1-1 and Comparative Example 1-1, Example 1-2 and Comparative Example 1-2, Example 1-3 and Comparative Example 1-3, and Example 1-4 and Comparative Example 1-4 have the same molar ratio of the nickel contained in the whole particle, respectively, thereby showing similar initial charging/discharging capacity and cycle characteristics. However, Examples 1-1 to 1-5 showing concentration gradient showed better performance than Comparative Examples 1-1 to 1-4.

Figure 25:
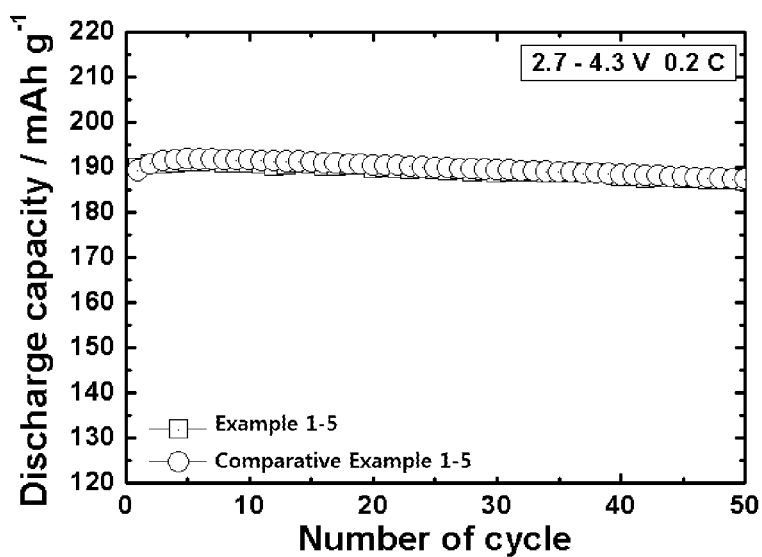
FIG. 25: the result of charging/discharging test and the result measuring cycle characteristics of each battery prepared by using the active material, which has the same concentration gradient and is prepared in Example 1-3 of the present invention prepared by using a CSTR reactor, and Example 1-5 of the present invention prepared by using a BATCH reactor, respectively.
Figure 26:
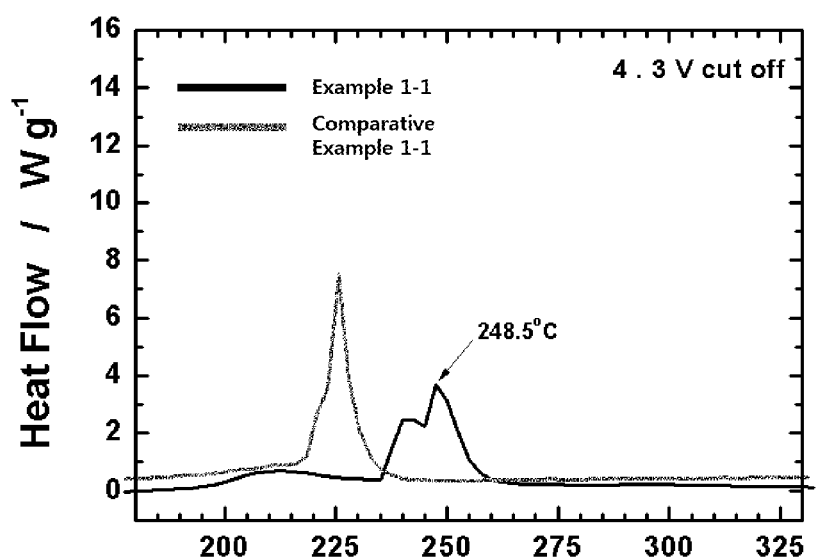
FIGS. 26 to 29: the results measuring heat flow of each cathode including active materials prepared in Examples 1-1 to 1-4 of the present invention and active materials prepared in Comparative examples 1-1 to 1-4, by charging at 4.3 V and then heating at the speed of 10° C./min by using a differential scanning calorimeter (DSC), respectively.
Figure 27:
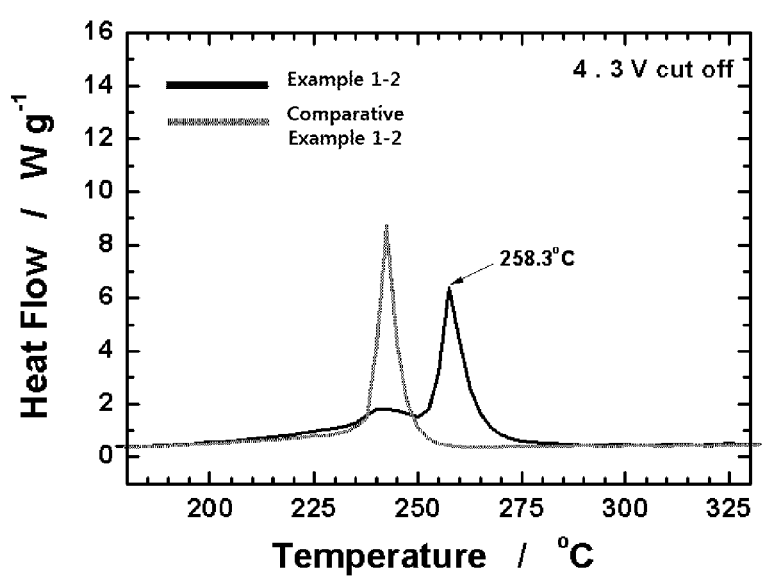
Figure 28:
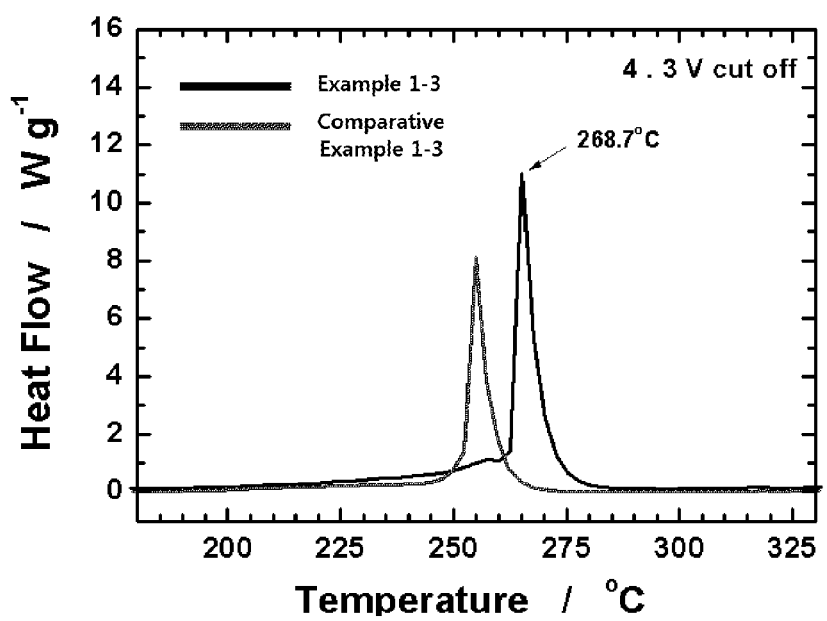
Figure 29:
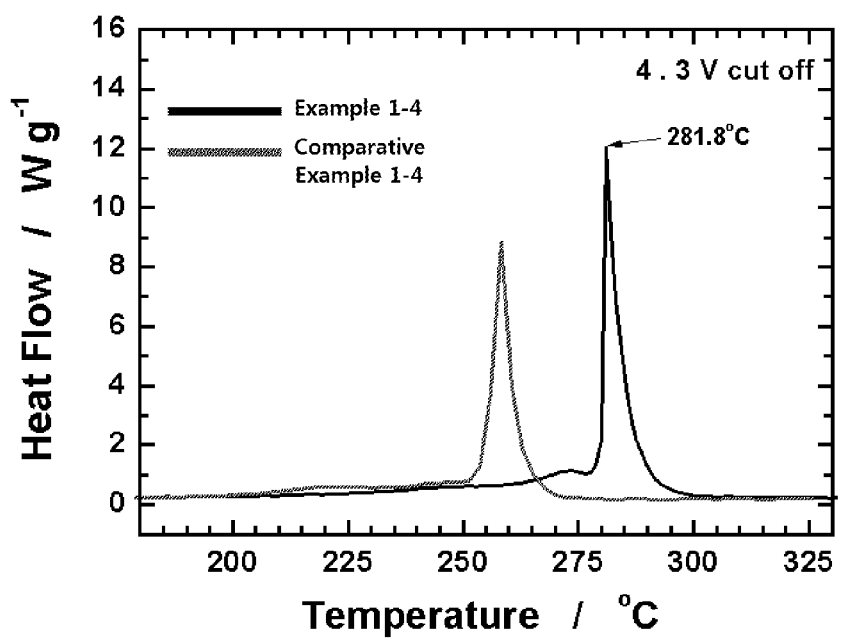

Further, in FIG. 25, when comparing Example 1-3 prepared by using a CSTR reactor and Example 1-5 prepared by using a BATCH reactor, which show the same concentration gradient, they showed identical charge/discharge characteristics.

TEST EXAMPLE 1-5

Evaluation of Thermostability by DSC Measurement

The cathode containing the active materials prepared in Examples 1-1 to 1-4 and the active materials prepared in Comparative Examples 1-1 to 1-4, were charged at 4.3 V, respectively, and thermostability was measured by using a differential scanning calorimeter (DSC) and heating at a rate of 10° C./min. The results are shown in FIGS. 26 to 29.

As shown in FIGS. 26 to 29, when the active materials prepared in Examples 1-1 to 1-4 according to the present invention were contained, an exothermic peak was showed at the higher temperature in the differential scanning calorimeter (DSC) than when the active materials prepared in Comparative Examples 1-1 to 1-4 were contained. Thus, when the active materials prepared in Examples 1-1 to 1-4 according to the present invention were contained, the thermostability was much improved than when the active materials prepared in Comparative Examples 1-1 to 1-4 were contained.

Namely, in the present invention, the concentration of one metal is constant, and the concentrations of the other two metals are increased or decreased with continuous concentration gradient from the core to the surface part. Accordingly, because the concentrations of the metals inside of the particle are not rapidly changed and show stable structure, it could be confirmed that the thermostability is largely increased.

Figure 30:
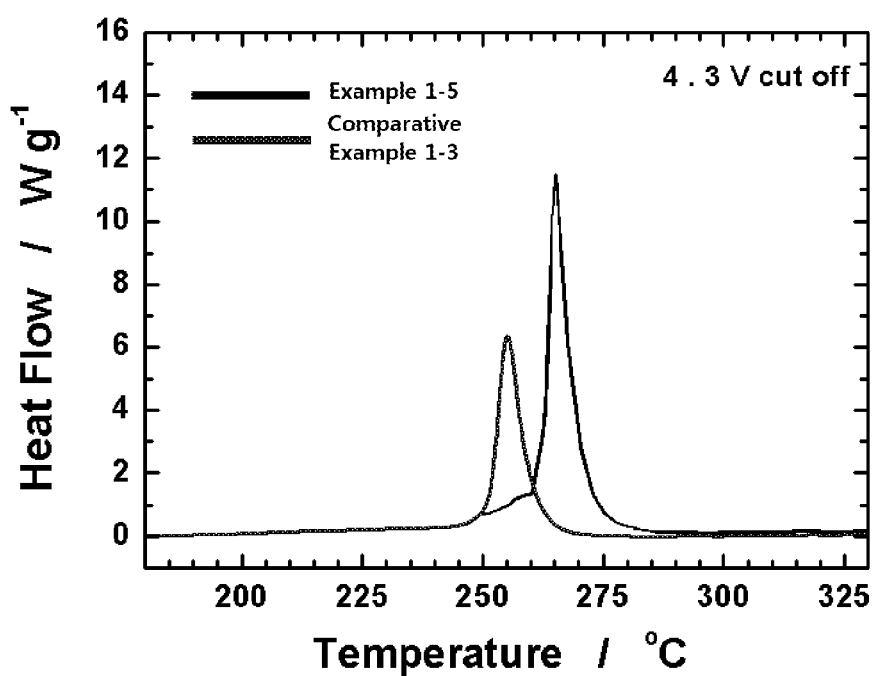
FIG. 30: the results measuring heat flow of each cathode including the active material, which has the same concentration gradient and is prepared in Example 1-3 of the present invention prepared by using a CSTR reactor, and Example 1-5 of the present invention prepared by using a BATCH reactor, by charging at 4.3 V and then heating at the speed of 10° C./min by using a differential scanning calorimeter (DSC), respectively.

Further, in FIG. 30, when comparing Example 1-3 prepared by using a CSTR reactor and Example 1-5 prepared by using a BATCH reactor, which show the same concentration gradient, they showed DSC peaks at the same temperature.

EXAMPLE 2

Case of Constant Cobalt Concentration

EXAMPLE 2-1

In order to prepare a compound, wherein the Co concentration is constant from the core to the surface, the Ni concentration is decreased, and the Mn concentration is increased, a 2.4 M metal aqueous solution, prepared by mixing nickel sulfate and cobalt sulfate at the molar ratio of 90:10, as a metal salt aqueous solution for forming the core and a metal aqueous solution containing nickel sulfate, cobalt sulfate and manganese sulfate at the molar ratio of 65:10:25 as a metal salt aqueous solution for forming the surface part were prepared, and a precursor was prepared as described in Example 1-1.

$LiNO_3$ as a lithium salt was mixed to the obtained active material precursor, heated at a rate of 2° C./min, and then pre-calcined by maintaining at 280° C. for 10 hours followed by calcining at 750° C. for 15 hours to obtain a final active material particle. The size of the finally obtained active material particle was 12 μm.

As Comparative Example, a precursor containing nickel, cobalt and manganese at the molar ratio of 72:10:18, wherein each metal concentration is the same in the whole particle was prepared.

TABLE 3

|  | Ni | Co | Mn |
| --- | --- | --- | --- |
| Comparative Example 2 | 72 | 10 | 18 |

TEST EXAMPLE 2-1

Confirmation of Formation of Concentration Gradient in Precursor Particle

Figure 31:
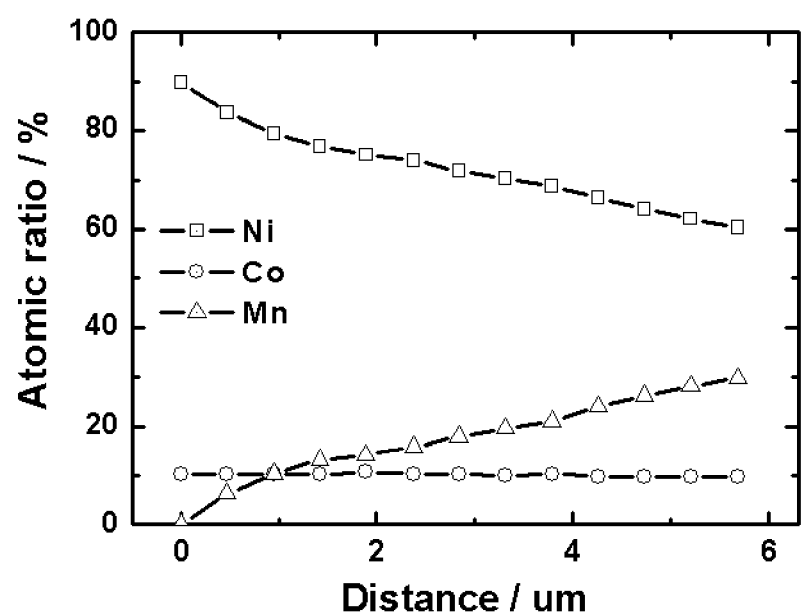
FIG. 31: the result measuring the atomic ratio in the precursor particle prepared in Example 2-1 of the present invention.

In order to confirm the concentration gradient structure of each metal from the core to the surface of the precursor particle of the present invention, the atomic ratio of the precursor particle prepared in Example 2-1 was measured by using EPMA (Electron Probe Micro Analyzer) while moving form the core to the surface part as described in Test Example 1-1, and the results is shown in FIG. 31.

In FIG. 31, it could be confirmed that: the Co metal concentration was constant from the core to the surface, the Mn concentration was gradually increased with certain gradient, but the Ni concentration was gradually decreased with certain gradient.

TEST EXAMPLE 2-2

Figure 32:
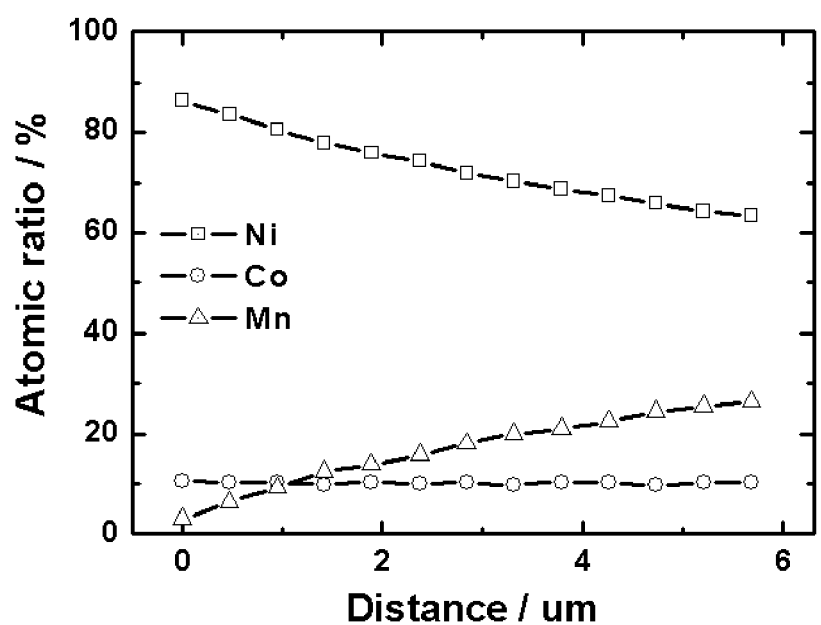
FIG. 32: the results measuring the atomic ratio in the precursor particle prepared in Example 2-1 of the present invention after heat-treating.

Confirmation of Formation of Concentration Gradient in Active Material Particle After Heat-treatment In order to confirm whether each metal shows concentration gradient from the core to the surface part after heat-treating the precursor particle of the present invention, the atomic ratio of the particle prepared in Example 2-1 was measured by using EPMA (Electron Probe Micro Analyzer) while moving from the core to the surface as described in Test Example 1-2, and the result is shown in FIG. 32.

TEST EXAMPLE 2-3

Figure 33:
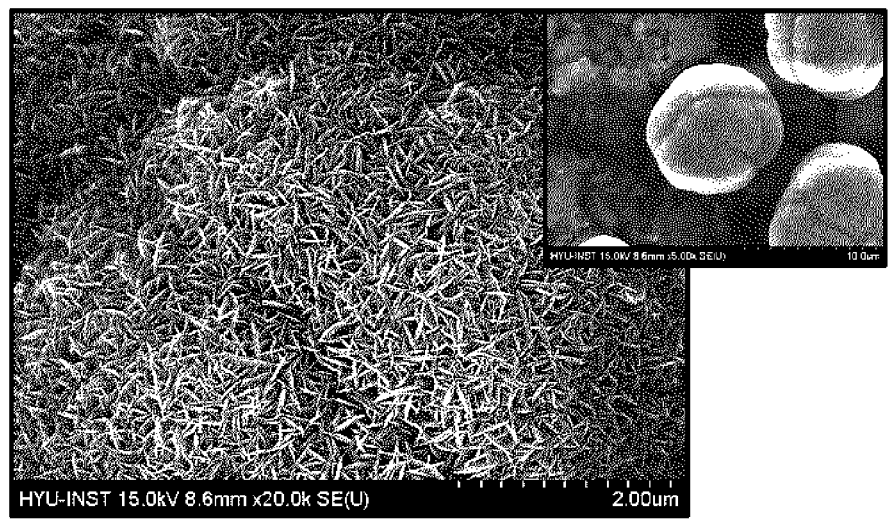
FIGS. 33 to 34: the surface images of the precursor particle and the final active material prepared in Example 2-1 of the present invention measured by scanning electron microscope.
Figure 34:
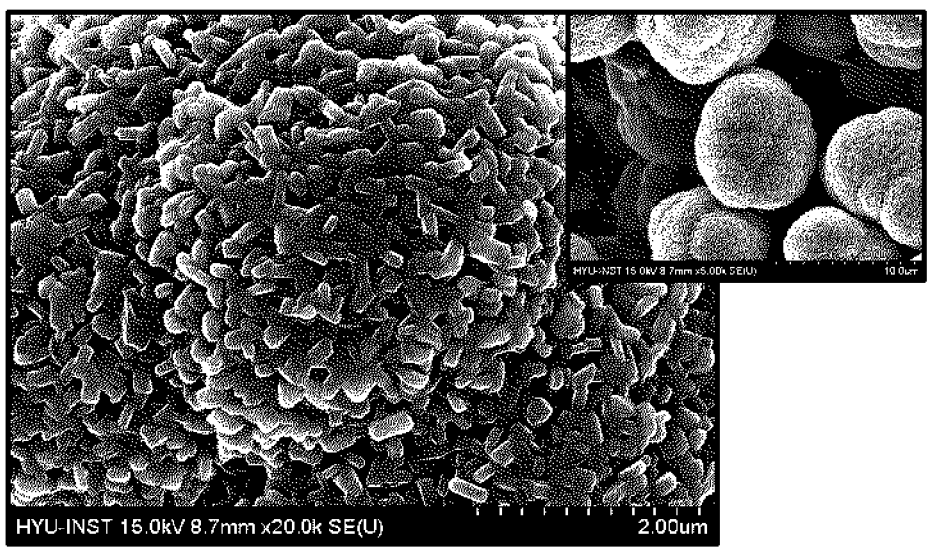

Confirmation of Surface Image of Particles of Precursor and Active Material Surface images of the precursors and the final active materials prepared in Example 2-1 and Comparative Example 2-1 were taken by using a scanning electron microscope, and the results are shown in FIGS. 33 to 34.

Each of the pictures is a surface image with different magnification, and it could be confirmed that each particle was homogeneously formed.

TEST EXAMPLE 2-4

Measuring Charging/Discharging Capacity and Cycle Characteristics

Cathodes were prepared by using the active material prepared in Example 2-1 and the active material prepared in Comparative Example 2-1, and applied to cylindrical lithium secondary batteries, respectively.

Figure 35:
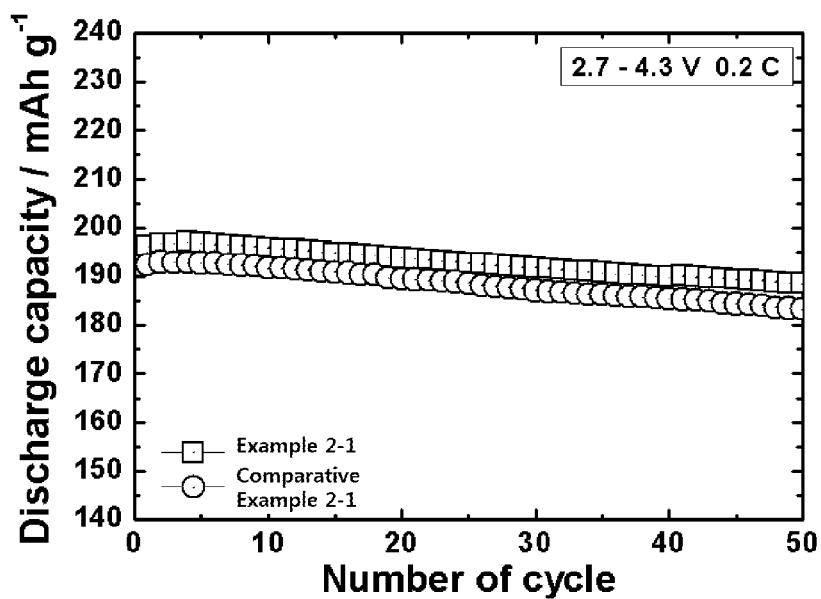
FIG. 35: the results of charging/discharging test and the results measuring cycle characteristics of the battery prepared by using the active material prepared in Example 2-1 of the present invention.

For the batteries prepared by using the active material prepared in Example 2-1 and the active material prepared in Comparative Example 2-1, charging/discharging test and cycle characteristics were measured, and the results are shown in FIG. 35. The charging/discharging was conducted 10 times per each sample at the condition of 2.7~4.3 V and 0.2 C, and the average value was taken.

In FIG. 35, Example 2-1 and Comparative Example 2-1 have the same molar ratio of the nickel contained in the whole particle, respectively, thereby showing similar initial charging/discharging capacity and cycle characteristics. However, Example 2-1 showing concentration gradient showed better performance than Comparative Example 2-1.

TEST EXAMPLE 2-5

Evaluation of Thermostability by DSC Measurement

The cathode containing the active materials prepared in Example 2-1 and Comparative Example 2-1 were charged at 4.3 V, respectively, and thermostability was measured by using a differential scanning calorimeter (DSC) and heating at a rate of 10° C./min. The results are shown in FIG. 36.

Figure 36:
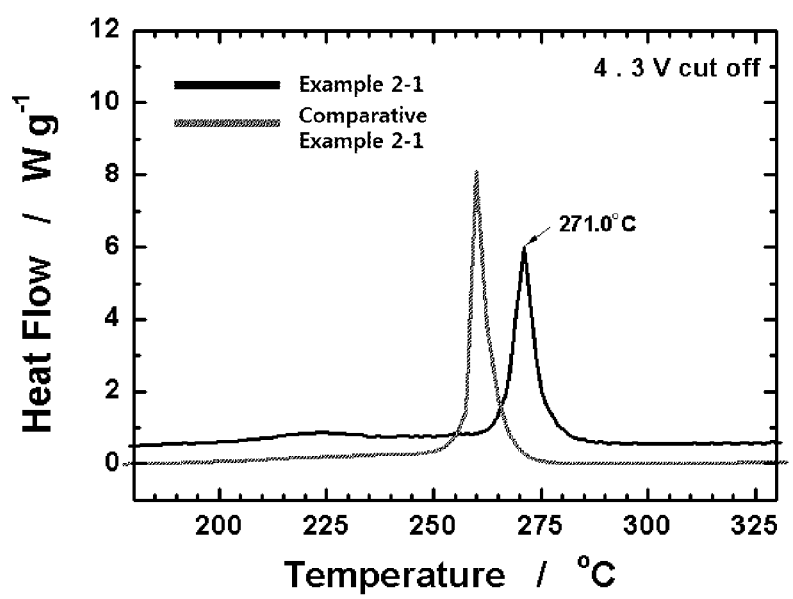
FIG. 36: the results measuring heat flow of each cathode including active materials prepared in Example 2-1 of the present invention and active materials prepared in Comparative example 2-1, by charging at 4.3 V and then heating at the speed of 10° C./min by using a differential scanning calorimeter (DSC).

As shown in FIG. 36, the cathode containing the active material prepared in Example 2-1 according to the present invention showed an exothermic peak at the higher temperature in the differential scanning calorimeter (DSC) than the cathode containing the active material prepared in Comparative Example 2-1. Thus, in the cathode containing the active material prepared in Example 2-1 according to the present invention, wherein the Co was contained constantly, the Ni was decreased with continuous concentration gradient, and the Mn was increased with continuous concentration gradient, and the cathode containing the active material prepared in Comparative Example 2-1 were the same in the composition. But, the active material prepared in Example 2-1, wherein the metal concentration showed concentration gradient in the whole particle, showed much improved thermostability than the active material prepared in Comparative Example 2-1, wherein the metal concentration was constant in the whole particle.

Namely, in the present invention, the concentration of one metal is constant, and the concentrations of the other two metals are increased or decreased with continuous concentration gradient from the core to the surface part. Accordingly, because the concentrations of the metals inside of the particle are not rapidly changed and show stable structure, it could be confirmed that the thermostability is largely increased.

Industrial Applicability

In the cathode active material for a lithium secondary battery according to the present invention, the concentration of one metal is constant from the core to the surface part, and the concentrations of the other two metals are increased or decreased with continuous concentration gradient from the core to the surface part. Accordingly, the crystal structure of the particle is stabilized and the thermostability is increased because there is no phase boundary having rapid concentration change from the particle core to the surface part.

Accordingly, the lithium secondary battery having the cathode active material shows excellent capacity characteristics as well as excellent lifetime characteristics and charge/discharge characteristics, and has thermostability even in high temperatures. Particularly, when the Ni concentration of the cathode active material according to the present invention, which shows the whole particle concentration gradient, is maintained constantly, a stable active material showing high capacity can be prepared.

While the invention has been described with respect to the above specific embodiments, it should be recognized that various modifications and changes may be made and also fall within the scope of the invention as defined by the claims that follow.

What is claimed is:

1. In a positive electrode active material for a lithium secondary battery, with whole particle concentration gradient comprises:
    a core expressed by the following formula 1; and
    a surface part expressed by the following formula 2,

$$Li_{a1}M1_xM2_{y1}M3_{z1}M4_wO_{2+\delta} \qquad \text{[Formula 1]}$$

$$Li_{a2}M1_xM2_{y2}M3_{z2}M4_wO_{2+\delta} \qquad \text{[Formula 2]}$$

wherein
the concentration of M1 is constant from the core to the surface part;
the concentration of M2 and the concentration of M3 have continuous concentration gradient from the core to the surface,
M1 is Ni, M2 is Mn and the M3 is Co;
M4 is selected from the group consisting of Fe, Na, Mg, Ca, Ti, V, Cr, Cu, Zn, Ge, Sr, Ag, Ba, Zr, Nb, Mo, Al, Ga, B and a combination thereof; $0<a1\leq1.1$, $0<a2\leq1.1$, $0\leq x\leq1$, $0\leq y1\leq1$, $0\leq y2\leq1$, $0\leq z1\leq1$, $0\leq z2\leq1$, $0\leq w\leq0.1$, $0.0\leq\delta\leq0.02$, $0<x+y1+z1\leq1$, $0<x+y2+z2\leq1$, and $y1\leq y2$, $z2\leq z1$;
the concentration of a metal making up the cathode active material for a lithium secondary battery shows continuous concentration gradient in the entire region, from the particle core to the surface part;
the concentration of M2 is increased with continuous concentration gradient from the core to the surface part; and
the concentration of M3 is decreased with continuous concentration gradient from the core to the surface part.

2. The cathode active material according to claim 1, wherein the concentration range of M1, x is $0.4\leq x\leq 1$.

3. The cathrode active material according to claim 2, wherein the concentration range of M1 is $0.6\leq x\leq0.9$, $0.2\leq|y2-y1|\leq0.4$, $0.2\leq|z2-z1|\leq0.4$, $0.2\leq y2\leq0.4$ and $0\leq z2\leq0.1$.

4. The cathode active material according to claim 1, wherein the concentration gradient of M2 is constant from the center part to the surface part of the particle.

5. The cathode active material according to claim 1, wherein the concentration gradient of M3 is constant from the particle core to the surface part.

6. A method for preparing a cathode active material according to claim 1 comprises:
a first step of preparing a metal salt aqueous solution for forming the core and a metal salt aqueous solution for forming the surface part, which contain M1, M2 and M3 as a metal salt aqueous solution, wherein the concentration of M1 is the same in each solution, the concentration of M2 is different in each solution, and the concentration of M3 is different in each solution;
a second step of forming precipitates by mixing the metal salt aqueous solution for forming the core and the metal salt aqueous solution for forming the surface part at a mixing ratio from 100 v %:0 v % to 0 v %:100 v % with gradual change and by mixing a chelating agent and a basic aqueous solution to a reactor at the same time, wherein the concentration of M1 is constant from the center part to the surface part, and the concentrations of M2 and M3 have continuous concentration gradient from the core to the surface part;
a third step of preparing an active material precursor by drying or heat-treating the obtained precipitates; and
a fourth step of preparing an active material precursor and a lithium salt and then heat- treating thereof.

7. The method according to claim 6, wherein the molar ratio of the chelating agent and the metal salt aqueous solution is 0.2 to 1.0:1.

8. The method according to claim 6, wherein the heat-treating process after mixing the active material precursor and the lithium salt is conducted at 700 to 1100° C.

9. The method according to claim 6, which further comprises a pre-calcining process by maintaining at 250 to 650° C. for 5 to 20 hours, before heat-treating after mixing the active material precursor and the lithium salt.

10. The method according to claim 6, wherein in the second step, pH is within 10 to 12.5, reaction temperature is within 30 to 80° C., and reaction stirring speed is within 100 to 2000 rpm under nitrogen flow.

11. A lithium secondary battery comprising the cathode active material for a lithium secondary battery of claim 1.

12. The cathode active material according to claim 1, wherein the center part of the particle is within the radius 0.2 μm from the middle of the active material particle, and the surface part of the particle is within the radius 0.2 μm from the outer most shell of the active material particle.

13. A cathode active material for a lithium secondary battery with whole particle concentration gradient comprises:
a core expressed by the following formula 1; and
a surface part expressed by the following formula 2,

[Formula 1]

[Formula 2]

wherein
M1 is Mn, M2 is Co and M3 is Ni;
the concentration of M1 is constant from the core to the surface part;
the concentration of M2 and the concentration of M3 have continuous concentration gradient from the core to the surface;
M4 is selected from the group consisting of Fe, Na, Mg, Ca, Ti, V, Cr, Cu, Zn, Ge, Sr, Ag, Ba, Zr, Nb, Mo, Al, Ga, B and a combination thereof; $0<a1\leq1.1$, $0<a2\leq1.1$, $0\leq x\leq1$, $0\leq y1\leq1$, $0\leq y2\leq1$, $0\leq z1\leq1$, $0\leq z2\leq1$, $0\leq w\leq0.1$, $0.0\leq\delta\leq0.02$, $0<x+y1+z1\leq1$, $0<x+y2+z2\leq1$, and $y1\leq y2$, $z2\leq z1$;
the concentration of a metal making up the cathode active material for a lithium secondary barter shows continuous concentration gradient in the entire region, from the particle core to the surface part;
the concentration of M2 is increased with continuous concentration gradient from the core to the surface part; and the concentration of M3 is decreased with continuous concentration gradient from the core to the surface part.

14. The cathode active material according to claim 13, wherein the concentration range of M1, x is $0.4\leq x\leq1$.

15. The cathode active material according to claim 14, wherein the concentration range of M1 is $0.6\leq x\leq0.9$, $0.2\leq|y2-y1|\leq0.4$, $0.2\leq|z2-z1|\leq0.4$, $0.2\leq y2\leq0.4$ and $0\leq z2\leq0.1$.

16. A lithium secondary battery comprising the cathode active material for a lithium secondary battery of claim 13.

17. A method for preparing a cathode active material according to claim 13 comprises:
a first step of preparing a metal salt aqueous solution for forming the core and a metal salt aqueous solution for forming the surface part, which contain M1, M2 and M3 as a metal salt aqueous solution, wherein the concentration of M1 is the same in each solution, the concentration of M2 is different in each solution, and the concentration of M3 is different in each solution;
a second step of forming precipitates by mixing the metal salt aqueous solution for forming the core and the metal salt aqueous solution for forming the surface part at a mixing ratio from 100 v %:0 v % to 0 v %:100 v % with gradual change and by mixing a chelating agent and a basic aqueous solution to a reactor at the same time, wherein the concentration of the M1 is constant from the core to the surface part, and the concentrations of M2 and M3 have continuous concentration gradient from the core to the surface part;
a third step of preparing an active material precursor by drying or heat-treating the obtained precipitates; and
a fourth step of mixing the active material precursor and a lithium salt and then heat-treating thereof.

18. The method according to claim 17, which further comprises a pre-calcining process by maintaining at 250 to 650° C. for 5 to 20 hours, before heat-treating after mixing the active material precursor and the lithium salt.

19. The cathode active material according to claim 13, wherein the concentration gradient of M2 or M3 is constant from the particle core to the surface part.

20. The cathode active material according to claim 13, wherein the center part of the particle is within the radius 0.2 μm from the middle of the active material particle, and the surface part of the particle is within the radius 0.2 μm from the outer most shell of the active material particle.

* * * * *